May 19, 1959 A. LIBERMAN 2,887,533

COMMUNICATION APPARATUS

Filed May 19, 1954

Inventor
Arie Liberman
By. Schroeder, Hofgren, Brady & Wegner
Attorneys

United States Patent Office 2,887,533

Patented May 19, 1959

2,887,533

COMMUNICATION APPARATUS

Arie Liberman, Chicago, Ill.

Application May 19, 1954, Serial No. 430,956

5 Claims. (Cl. 179—2.5)

This invention relates to a communication system and particularly to a modulated carrier wave communication system utilizing power lines for transmitting the carrier wave between units and to the method for providing the modulated carrier.

Communication systems which utilize power lines for the transmission of a modulated carrier wave, sometimes referred to as carrier current systems, are particularly subject to low frequency interference developed on the power line. It is believed that this interference is due largely to the connection to the line of other loads having rectifier elements included therein or to rectifying actions in or in connection with the line, as occur where two dissimilar conductors are in physical and electrical contact. The interference with which we are concerned herein is primarily 60 cycles per second, the normal line frequency, and the various harmonics thereof.

It is a principal feature of this invention to provide a novel modulated carrier communication system particularly adapted for use in power line communication, with which the effect of low frequency interference is, for all practical purposes, eliminated or at any rate substantially reduced so that the desired signals are readily understandable.

Another feature is the provision of a system wherein the modulated carrier has a relatively low average amplitude with a plurality of peaks corresponding to peaks of one sense of the modulating signal and substantially more than double the average unmodulated carrier amplitude.

A further feature is that the unmodulated carrier has an amplitude much less than the rated capacity of the oscillator and modulation is effected in such a manner that peaks of modulating signal of one sense increase the carrier amplitude to substantially more than double the unmodulated carrier amplitude while peaks of the modulating signal of the opposite sense decrease the carrier amplitude to a much lesser extent.

Still another feature is that variations of the modulating signal of one sense cause a substantially linear increase in the carrier amplitude to much more than double the unmodulated carrier amplitude, while variations of the modulating signal of the opposite sense cause a decrease in the modulated carrier of a much lesser extent.

Figure 1:
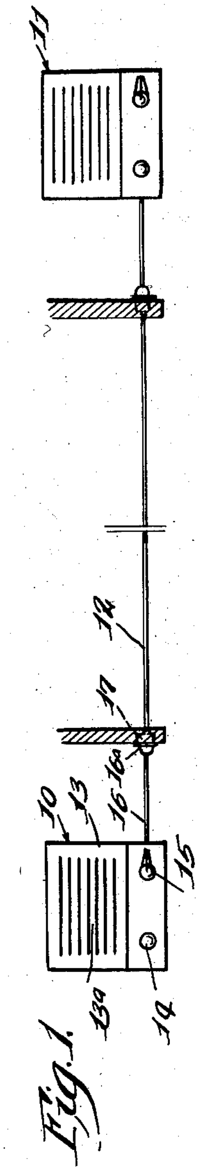
Figure 2:
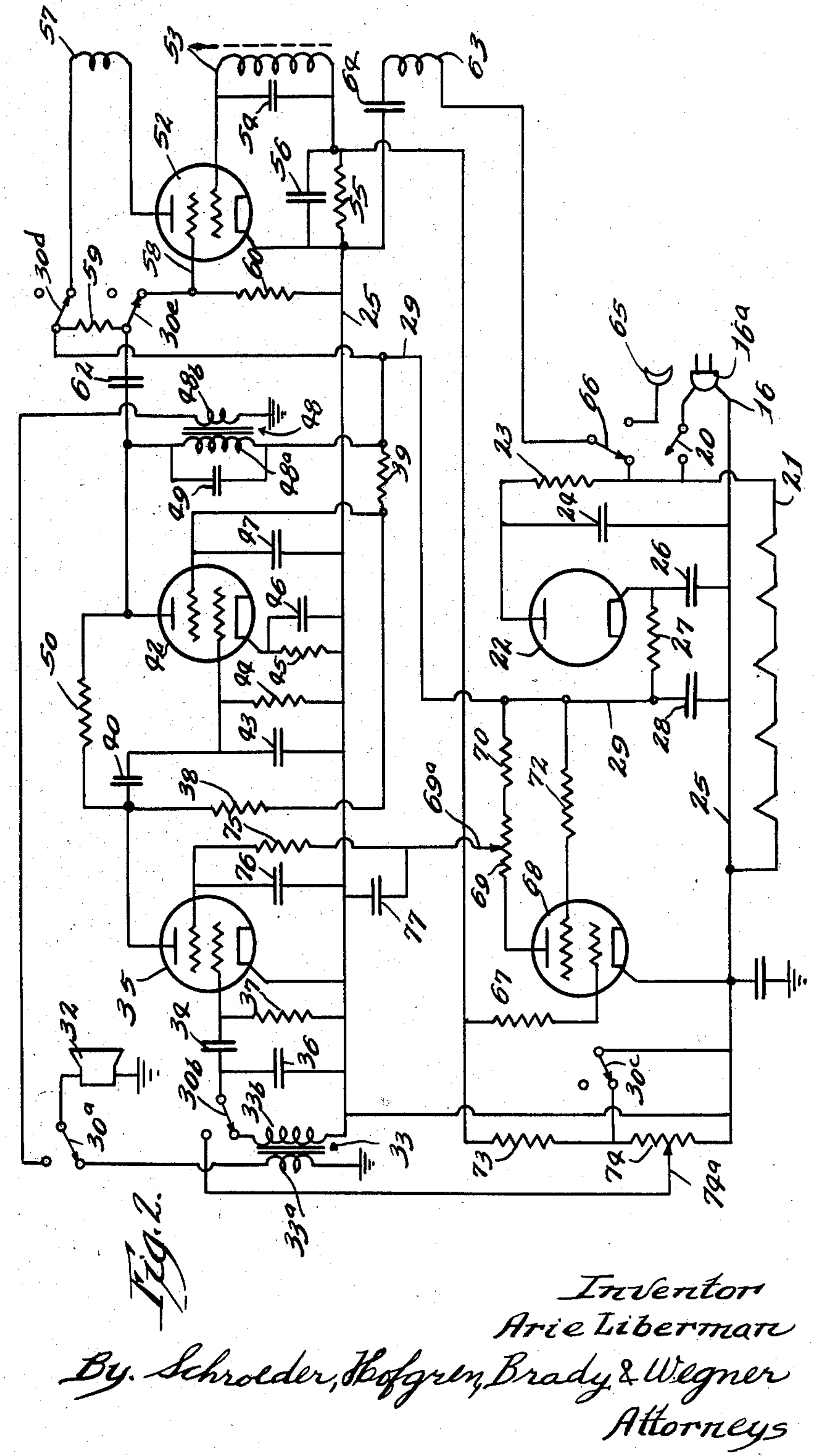

Further features and advantages will readily be apparent from the following specification and from the drawings, in which:

Figure 1 is a diagrammatic illustration of a modulated carrier wave intercommunication system; and Figure 2 is a schematic diagram of one unit of such a system.

Intercommunication systems utilizing a modulated carrier wave impressed on a power transmission line are well known. In general, such systems have two or more local units or stations which obtain their power from the power line (generally 110 volts, 60 cycle A.C.) over which the messages are sent. The local units usually include a combination speaker-microphone, one or more stages of audio amplification, an oscillator and a modulator. A message at one station is impressed on the carrier wave and coupled to the power line from which it is picked up at the other station, the modulating signal removed from the carrier by a detector, and then amplified and broadcast through a speaker.

Most intercommunication systems of this type, and particularly those which operate from a 60 cycle A.C. line as distinguished from those which operate from a D.C. line, are extremely noisy. Oftentimes the noise level is so high that it is impossible to understand the message being transmitted. While squelch circuits have heretofore been provided for cutting off or reducing the gain of the receiving circuits when no signal is being received, this does not help eliminate noise during signal reception.

It is believed that a large part, if not substantially all, the low frequency interference, that is the line frequency and the lower harmonics thereof, is due to rectifier action taking place in the transmission line and in loads connected to the line between the stations of the intercommunication system. Many devices which are electrically operated include as a part thereof a rectifying system for converting alternating current to direct current, for example, radios, wire recorders, amplifiers, television sets and even the units of the intercommunication system. In addition, a certain amount of rectification takes place at any point where there is physical and electrical contact between dissimilar materials as where connections to the line may be of a material other than that used in the line.

It is well known that rectifying elements may be used as modulators and it is believed that a large part of the low frequency noise which is present in carrier wave intercommunication systems results from modulation of the carrier wave by the 60 cycle line frequency occurring in the various rectifiers and rectifying contacts made to the line. This belief is further substantiated by the fact that the removal of all loads from the line or the use of isolation transformers in connecting loads to the line substantially eliminates the low frequency noise in the intercommunication system. It is not practical, however, to use a special power line for the intercommunication system or to install isolation transformers for all other loads.

Generally, carrier wave intercommunication systems utilize a conventional amplitude modulated signal in which an oscillatory carrier wave having a normal unmodulated amplitude equal to the rated capacity of the oscillator is modulated by the desired intelligence or audio signal, with the modulating system being such that up to 100% modulation normally takes place on peaks of the modulating signal, with 100% modulation, modulated carrier peaks are double the amplitude of the unmodulated carrier.

I have found that by reducing the normal unmodulated amplitude of the carrier wave to a small fraction of the usual amplitude used (as determined by the tube capabilities) and by modulating in such a manner that peaks of modulating signal of one sense increase the carrier amplitude to substantially more than double the unmodulated carrier amplitude, while peaks of the modulating signal of the opposite sense decrease the carrier amplitude to a much lesser exent, I am able to reduce materially, if not to eliminate, low frequency interference resulting from modulation of the carrier wave by the power line frequency.

Referring now to the drawings, in Figure 1 two units 10 and 11 of a carrier wave intercommunication system are shown connected to power line 12, from which they are energized and over which the desired messages are transmitted. The two units are identical and only one will be described. The elements of the unit are housed within a cabinet 13 having louvered opening 13a therein and behind which the speaker-microphone is mounted.

A control knob 14 operates the power switch of the unit and controls the gain of the amplifier while a lever 15 operates a talk-listen switch. An electrical cord 16 has a male plug 16*a* at the end thereof and adapted for connection to an outlet 17 which in turn is connected to the electrical power line 12.

The particular embodiment of the intercommunication unit shown in Figure 2 and hereafter described in detail is designed for operation from either a 110 volt, 60 cycle A.C. line or a 110 volt D.C. line. For the purposes of this description, it will be assumed that the unit is being operated from an alternating source and it is with an A.C. supply that the most objectionable interference occurs. The particular tube types and component values given herein are intended to illustrate an operable embodiment of an intercommunication unit and, unless specified otherwise, are not critical to the operation of the invention and many changes and modifications will be obvious to those skilled in the art.

When power switch 20 is closed, the series connected filament string 21 is placed across the line energizing each of the tubes. In addition, a rectifier 22, which may be a 35Z5, is connected across the line to provide a B+ operating voltage for the tubes of the unit. Resistors 23, 47 ohms, is connected in series with the rectifier to limit the current drawn therethrough and capacitor 24, .1μf. (microfarad), is connected from the anode of rectifier 22 to the B— line 25 which is returned to the other side of the power line. A filter circuit including capacitor 26, 40 μf., resistor 27, 220 ohms, and capacitor 28, 20 μf., is connected to the cathode of rectifier 22 and a filtered D.C. B+ voltage of approximately 110 volts is provided on line 29.

The talk-listen switch, which is operated by control lever 15 comprises five sections 30*a*, 30*b*, 30*c*, 30*d* and 30*e*, and is normally biased to the listen position. The talk-listen switch, however, is shown in the talk position in the schematic diagram.

During transmission (when the talk-listen switch is in the talk position) the speaker-microphone 32 is connected through section 30*a* of the talk-listen switch to the primary winding 33*a* of an audio input transformer 33. The secondary 33*b* of the audio input transformer is connected through section 30*b* of the talk-listen switch and blocking capacitor 34, .05 μf., to the control grid of an audio amplifier 35, a 12SJ7. Capacitor 36, 500 μμf., is connected across the secondary winding 33*b* of the audio transformer and serves as a carrier wave by-pass. A grid leak resistor 37, 10 megohms, is connected between the control grid and cathode of amplifier 35. The anode of amplifier 35 is connected through plate load resistor 38, .5 megohm and resistor 39, 4700 ohms, to B+ line 29.

The audio output of amplifier 35 is coupled through capacitor 40, .005 μf., to the control grid of a second audio amplifier and modulator tube 42, a 50L6. Capacitor 43, 500 μμf., is connected from the control grid of amplifier 42 to the B— line 25 to by-pass the carrier wave around grid resistor 44, .5 megohm. A bias resistor 45, 220 ohms, is connected to the cathode of amplifier 42 and the B— line and is shunted by capacitor 46, 10 μf., the screen grid of amplifier 42 is connected to the low voltage side of resistor 39 and capacitor 47, 8 μf., provides decoupling for both the screen grid of the amplifier 42 and the anode of amplifier 45. The output of amplifier 42 is developed across the primary winding 48*a* of audio output transformer 48, the secondary 48*b* of which is open when the talk-listen switch is in the talk position. Capacitor 49, .01 μf., connected across primary winding 48*a* keeps the carrier signal out of transformer 48. Resistor 50, 5 megohms, is connected between the anodes of amplifiers 35 and 42 and provides a small amount of degenerative feedback.

Tube 52, a 50L6, is connected for operation as a tuned grid oscillator with the frequency of oscillation, normally of the order of 150 kc., being determined by the parallel resonant circuit composed of inductor 53 and capacitor 54, 150 μμf., connected to the control grid. The control grid is returned to the cathode and to the B— line through the parallel combination of resistor 55, .5 megohm, and capacitor 56, 100 μμf., which provides the necessary control grid bias. The time constant of the self-bias circuit is much greater than the period of one cycle of the frequency of oscillation. The anode of oscillator 52 is connected through feedback winding 57 and section 30*d* of the talk-listen switch to the B+ line 29.

The screen grid 58 of oscillator 52 is maintained at a substantially constant D.C. potential by a voltage divider made up of resistor 59, 50,000 ohms and resistor 60, 15,000 ohms, connected in series by section 30*e* of the talk-listen switch between the B+ line 29 and the B— line 25, screen grid 58 being connected to the intermediate juncture of the resistors 59 and 60. The voltage divider establishes a relatively fixed D.C. potential on screen grid 58 of about 25 volts. As only a very small grid current will be drawn under these conditions, the normal operating potential of screen grid 58 is about 15 volts. This low screen grid potential limits the amplitude of the oscillations of oscillator 52 to about one-quarter of the amplitude which the oscillator might produce if operated at its normal rated capacity. The modulating signal is coupled directly from amplifier-modulator tube 42 through blocking capacitor 62, .05 μf., and section 30*e* of the talk-listen switch to the screen grid 58 of oscillator 52.

The amplitude modulated carrier wave is coupled through pick-up winding 63 to power line 63. Capacitor 64, .1 μf., connected between pick-up winding 63 and B— line 25 limits the flow of current at power frequencies through pick-up winding 63 without affecting the modulated carrier.

Windings 53, 57 and 63 are all wound on the same coil and in the particular embodiment described utilize a ⅜ inch coil form with a movable slug core, oscillator winding 53 having 600 turns, feedback winding 57 having 200 turns, and pick-up winding 63, 10 or 11 turns.

In the event communication is to be carried on over extremely long distances where the resistance of the power line 12 would substantially attenuate the carrier wave signal, a low resistance transmission path may be provided by securing clip 65 to a suitable ground, such as a water pipe, and connecting pick-up winding 63 to the ground clip 65 through switch 66.

It will be recalled that the screen grid 58 of oscillator 52 is maintained at a voltage of approximately 15 volts by the action of the voltage divider made up of resistors 59 and 60 and the current drawn by the screen grid. The low screen grid voltage not only reduces the amplitude of the oscillations to about one-quarter of the normal rated value but also establishes the screen grid operating point of the lower end of the linear portion of the screen grid transfer characteristic (the variation of plate current with respect to screen grid voltage). As a result, when the modulating signal from amplifier 42 is applied to screen grid 58, positive swings of screen grid 58 cause a substantial and a relatively linear instantaneous increase in the amplitude of the carrier wave oscillations and with high amplitude modulating signals the amplitude of the carrier may be of the order of eight times the amplitude of the normal unmodulated carrier wave produced by the oscillator. This is a peak carrier amplitude of about double the rated continuous operating capacity of the tube. On the negative half cycles of the modulating signal the ampltude variations of the modulated carrier wave are materially less for a given modulating signal deviation than was the case with positive deviations as screen grid 58 is swung down into the nonlinear portion of the transfer characteristic and may even be driven to cutoff with a very strong signal. Although this results in a certain amount of distortion on one half of each cycle of the modulated signal (the negative half), the positive half cycles are substantially undistorted and the resultant audio signal at the receiving station is completely understandable, particularly inasmuch as the low frequency interference commonly encountered in carrier wave intercommunication systems is substantially eliminated.

The amplitude of the modulated carrier wave is controlled directly and instantaneously by the modulating signal as contrasted with a control of the carrier by the average amplitude of the modulating signal as is sometimes done.

It is believed that the substantial reduction, amounting practically to the complete elimination, of low frequency interference which is achieved with this novel modulating arrangement results from the fact that the unmodulated carrier wave has an extremely small amplitude and even when modulated, large portions of the carrier are also of an extremely small amplitude with only the positive half cycles of the modulating signal causing an increased carrier amplitude and then only to the extent necessary to conform with the amplitude of the modulating signal. In a conventional modulated carrier system, the modulating signal in effect rides on top of the carrier and if modulation is not maintained at 100% there is a substantial amount of waste carrier power in the resulting signal. It is apparent then that the modulated carrier signal from the transmitting unit disclosed herein is of relatively low amplitude, with random portions of increased amplitude corresponding to positive peaks of short duration in the modulating signal. The low frequency, 60 and 120 cycles per second, interference which is most troublesome thus has very little carrier on which to operate during the major portion of the transmission The carrier peaks (corresponding to positive modulation peaks) occur at random intervals and any interference modulation of them is not particularly noticeable in the receiver.

This system could be carried to the limit by providing an oscillating unit which normally is cut off and which breaks immediately into oscillation on one or the other of the half cycles of the modulating signal. At the present time, however, it is difficult if not impossible to operate an oscillator in this manner and obtain any degree of reliability or linearity in its operation. Accordingly, I find it most practical to bias the oscillator normally at about one-quarter of its rated continuous operation output.

The foregoing discussion is concerned with the present theory of the operation of the communication system and is given only as an aid to the understanding of the operation thereof. It is intended in no way to limit the invention as it may be found later that another theory better explains the results achieved.

Referring once again to Figure 2, when the lever 15 is released, the talk-listen switch returns to its normal unoperated condition, the opposite of that in which the five sections of the switch are shown in Figure 2. Through the operation of sections 30*d* and 30*e* of the switch, the positive voltages applied to the plate and screen grid elements of oscillator tube 52 are removed. The control grid and cathode of the tube operate as a diode detector, rectifying carrier wave signals which are coupled from the power line through winding 63 to winding 53 with the resulting audio signal being developed across a load comprising resistor 55 and capacitor 56.

When no signal is being received by the unit a relatively small voltage will be developed across resistor 55, due primarily to random noise. This small voltage is coupled through resistor 67, 1.5 megohms to the control grid of squelch tube 68, a 12AU6. The plate of tube 68 is connected through a squelch control resistor 69, .5 megohm, and resistor 70, .5 megohm, to the B+ line 29. The screen grid of tube 68 is also connected through a resistor 72, .5 megohm, to the B+ line. The control grid of tube 68 is returned to the B− line through resistor 73, .27 megohm, and volume control resistor 74, .5 megohm. With only noise voltage appearing in the output of the detector, tube 68 will conduct heavily and the control voltage developed at the variable tap 69*a* of the squelch control will be quite low.

The control voltage is coupled through dropping resistor 75, 2.2 megohms, to the screen grid of audio amplifier 35 and effectively cut the tube off during periods in which no signal is being received. When a carrier wave signal is received, the voltage developed across detector load resistor 55 increases. An increased negative voltage is applied to the control grid of squelch tube 68 reducing the current flow therethrough so that the voltage applied to the screen grid 35 is raised sufficiently to enable tube 35 to function properly as an audio amplifier. The squelch control, variable tap 69*b*, may be adjusted to insure proper operation of the squelch circuit.

Decoupling capacitors 76, .005 $\mu$f., and and 77, .1 $\mu$f., are connected respectively between screen grid of tube 35 and variable tap 69*a* and the B− lead 25.

When the talk-listen switch is in the talk position, volume control resistor 74 is shorted by section 39*c* of the switch. A constant negative voltage is developed across resistor 55 due to the self-bias of the oscillator and a portion of this negative voltage is applied to the grid of squelch tube 68. As a result, positive voltage adequate to cause normal operation is applied at the screen grid of amplifier 35.

A variable portion of the audio signal is obtained through movable contact 74*a* of the volume control and is coupled through section 30*b* of the talk-listen switch and to the control grid of amplifier 35. The audio signal is further amplified in tube 42 and coupled through audio output transformer 48 and section 30*a* of the talk-listen switch to the combined microphone and speaker 32 which now operates as a speaker.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a communication system wherein the modulated carrier is transmitted over a power line which is subject to low frequency interference from rectifying effects associated therewith, transmitting apparatus of the character described comprising: a source of variable amplitude carrier oscillations having a modulation characteristic with a linear portion and a non-linear portion; means biasing said source at the point between the linear and non-linear portions of the modulation characteristic, providing unmodulated oscillations having an amplitude substantially less than the normal amplitude of continuous oscillations available from said source under rated operating conditions; a source of variable amplitude modulating signal; means for applying said modulating signal to said carrier whereby the peaks of the modulating signal of one sense utilize the carrier in the linear portion of the modulation characteristic while the peaks of the modulating signal of the opposite sense utilize the carrier amplitude in the non-linear portion of the modulation characteristic; and means for coupling the carrier wave to the power transmission line.

2. A modulating system of the character described for providing a signal which is relatively unaffected by low frequency interference, comprising: a vacuum tube including a cathode, a control grid, a screen grid and an anode; circuit means connected to at least a portion of said elements, including the cathode, control grid and anode, for causing oscillation; voltage divider bias means connected to said screen grid element for normally maintaining said oscillations at a low level of the order of one-quarter of the normal maximum amplitude of continuous oscillations; a source of modulating voltage of variable amplitude; and means connecting said source of modulating voltage to said screen grid to provide a modulated carrier wave having peaks of maximum available carrier amplitude corresponding to positive peaks of the modulating voltage and portions of substantially no carrier corresponding to negative peaks of the modulating voltage.

3. In a communication system utilizing a power line subject to low frequency interference for the transmission of a modulated carrier wave, transmitting apparatus of the character described, comprising: a tube having cathode, plate and grid elements; a tuned circuit and a resistance-capacitance self-bias circuit connected between said grid and cathode elements, the time constant of said self-bias circuit being much greater than the period of one cycle of oscillation of said tuned circuit; feedback connection between said grid and another element of said tube for causing oscillation; bias means connected to an element of said tube for limiting the amplitude of the unmodulated oscillations to a small fraction of the normal continuous rating of said tube; and means for modulating said carrier with a modulating signal, said modulating means being connected to a tube element through a circuit having a time constant negligible with respect to the period of the modulating signal, said bias means and said modulating means being such that said modulating means can overmodulate without at any time completely suppressing oscillation of said tube.

4. In a communication system utilizing a power line subject to low frequency interference for the transmission of a modulated carrier wave, transmitting apparatus of the character described, comprising: a tube having cathode, plate, control grid and screen grid elements; a tuned circuit and a resistance-capacitance self-bias circuit connected between said control grid and cathode elements, the time constant of said self-bias circuit being much greater than the period of one cycle of oscillation of said tuned circuit; feedback connections between said plate and control grid elements for causing oscillation; voltage divider bias means connected to said screen grid for limiting the amplitude of the unmodulated oscillations to a small fraction of the normal continuous rating of said tube and sufficient only to maintain said oscillations; and means for modulating said carrier with a modulating signal, said modulating means being connected to said screen grid through a circuit having a time constant negligible with respect to the period of the modulating signal, said bias means and said modulating means being such that positive peaks of said modulating signal increase the amplitude of said carrier linearly to substantially the rated instantaneous capacity of said tube while negative peaks of said modulating signal reduce the amplitude of the carrier to a lesser extent without completely suppressing oscillation of said tube.

5. A communication system of the character described, comprising: a power transmission line subject to low frequency interference; a source of oscillatory carrier wave; a source of modulating signal, the amplitude of the unmodulated carrier wave being less than the amplitude of the modulating signal available from the source thereof; a modulator having a modulating characteristic with a linear portion and a non-linear portion; means for establishing operation of said modulator at a point between the linear and non-linear portions of the modulation characteristic, in the absence of a modulating signal; means for combining said carrier wave and said modulating signal in said modulator; and means for coupling said carrier wave to said power transmission line.

References Cited in the file of this patent

UNITED STATES PATENTS

| | | |
|---|---|---|
| 1,955,095 | Runge | Apr. 17, 1934 |
| 1,968,528 | Lampkin | July 31, 1934 |
| 2,385,566 | De Guire | Sept. 25, 1945 |
| 2,432,512 | Davis | Dec. 16, 1947 |
| 2,632,812 | Cooney | Mar. 24, 1953 |
| 2,765,443 | Rothman | Oct. 2, 1956 |